US011990069B2

(12) United States Patent
Ichikura

(10) Patent No.: US 11,990,069 B2
(45) Date of Patent: May 21, 2024

(54) DISPLAY DRIVER AND DISPLAY DEVICE

(71) Applicant: LAPIS Technology Co., Ltd., Yokohama (JP)

(72) Inventor: Hiroyoshi Ichikura, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/345,965

(22) Filed: Jun. 30, 2023

(65) Prior Publication Data

US 2023/0360569 A1 Nov. 9, 2023

Related U.S. Application Data

(63) Continuation of application No. 17/869,124, filed on Jul. 20, 2022, now Pat. No. 11,727,838.

(30) Foreign Application Priority Data

Jul. 30, 2021 (JP) ................................ 2021-125828
Nov. 15, 2021 (JP) ................................ 2021-185480

(51) Int. Cl.
*G09G 3/00* (2006.01)
*G09G 3/3275* (2016.01)
*G09G 3/36* (2006.01)

(52) U.S. Cl.
CPC .......... *G09G 3/006* (2013.01); *G09G 3/3275* (2013.01); *G09G 3/3688* (2013.01);
(Continued)

(58) Field of Classification Search
CPC .......... G09G 3/006; G09G 2310/0291; G09G 2330/12; G09G 2330/04; G09G 3/3275; G09G 3/3688
(Continued)

(56) References Cited

U.S. PATENT DOCUMENTS 9,158,316 B2 10/2015 Theiler
10,446,109 B2 * 10/2019 Shiibayashi ......... G09G 3/3696
(Continued)

FOREIGN PATENT DOCUMENTS

WO 2018079636 A1 5/2018

OTHER PUBLICATIONS

Full version of WO 2018/079636 (Year: 2018).

*Primary Examiner* — Jason M Mandeville
(74) *Attorney, Agent, or Firm* — Rabin & Berdo, P.C.

(57) ABSTRACT

A display driver includes an amplifier circuit that outputs an output current based on a differential signal indicating a difference between a gradation voltage corresponding to a video signal and an output voltage to a source line of a display panel, thereby supplying the output voltage to the source line. An output current detection circuit generates a mirror current by copying the output current, and outputs an output current detection signal representing the mirror current. A failure determination circuit determines whether a failure is occurring or has occurred in the source line or not by comparing the level of the output current detection signal with a prescribed threshold value. The output current detection circuit includes a transistor that generates a mirror current by receiving the differential signal at a gate thereof, and a variable resistance that generates an output current detection signal upon receiving the generated mirror current.

5 Claims, 11 Drawing Sheets

(52) U.S. Cl.
CPC . *G09G 2310/0291* (2013.01); *G09G 2330/04* (2013.01); *G09G 2330/12* (2013.01)

(58) Field of Classification Search
USPC .......................................................... 345/690
See application file for complete search history.

(56) References Cited

U.S. PATENT DOCUMENTS

| | | | | |
|---|---|---|---|---|
| 10,964,287 | B1 | 3/2021 | Tsuchi et al. | |
| 11,200,864 | B2 | 12/2021 | Tsuchi et al. | |
| 11,521,526 | B2 * | 12/2022 | Nohtomi | G09G 3/006 |
| 11,727,838 | B2 * | 8/2023 | Ichikura | G09G 3/3275 345/690 |
| 2013/0314064 | A1 | 11/2013 | Theiler | |
| 2017/0245379 | A1 | 8/2017 | Kang | |

* cited by examiner

DISPLAY DRIVER AND DISPLAY DEVICE

CROSS REFERENCE TO RELATED APPLICATION

This application is a continuation of U.S. application Ser. No. 17/869,124, filed on Jul. 20, 2022, which is based upon and claims the benefit of priority of the prior Japanese Patent Application No. 2021-125828, filed on Jul. 30, 2021 and the prior Japanese Patent Application No. 2021-185480, filed on Nov. 15, 2021, the entire contents of which are incorporated herein by reference.

TECHNICAL FIELD

The present invention relates to a display driver that drives a display panel in accordance with video signals, and a display device having the display driver.

BACKGROUND ART

In recent years, a greater number of automobiles are using a display panel such as a liquid crystal display panel or organic EL (electroluminescence) display panel. Such display panels are used not only for a car navigation system, but also for various types of electronic gages.

Incidentally, if a display panel breaks down and displays erroneous information while driving, it might cause a problem to the driving.

To solve this problem, a liquid crystal display device is proposed in which an inspection is performed to check if the display panel is having a failure during normal use, and if a failure is detected, an alert indicating the presence of the failure is issued to passengers of the vehicle (see WO2018-079636, for example).

This failure inspection circuit supplies a monitor input signal to one end of each source line of the liquid crystal display panel, and by comparing a monitor output signal at the other end of each source line with a prescribed expected value, identifies a short-circuit failure or open failure in the source lines. Thus, the failure inspection circuit includes monitor signal lines respectively connected to respective one ends of the source lines for inputting the monitor input signal for failure inspection, and a comparison circuit that compares the monitor output signal outputted from the other end of each source line with a prescribed expected value.

SUMMARY OF THE INVENTION

Problems to be Solved by the Invention

However, in the failure inspection described in WO2018-079636, a short circuit failure or open failure in the source lines of the display panel is detected through a size comparison using the expected value as a threshold value, and therefore, it was difficult to accurately detect other failures such as a small current leak. Also, in the failure inspection circuit described in WO2018-079636, a switch is connected to the other end of each source line to retrieve the monitor output signal, which poses a problem of an increased output load of the amplifier that outputs driving voltages to the source lines.

To solve these problems, the present invention aims at providing a display driver that can accurately detect a failure occurring in a display panel without increasing an output load, and a display device.

A display driver of the present invention includes an amplifier circuit that receives a gradation voltage having a voltage value corresponding to a luminance level indicated by a video signal, and that supplies an output voltage having a voltage value corresponding to the gradation voltage to a source line of a display panel by outputting an output current based on the gradation voltage to the source line; an output current detection circuit that generates a mirror current by copying the output current, and outputs an output current detection signal having a level corresponding to a current size of the mirror current; and a failure determination circuit that determines whether a short circuit failure or current leak failure is occurring in the source line or not by comparing the level of the output current detection signal outputted from the output current detection circuit with a prescribed threshold value, wherein the amplifier circuit includes: a differential unit that generates a differential signal that represents a difference between the gradation voltage and the output voltage; and a first transistor that receives the differential signal at a gate thereof, and sends out the output current from a first output node connected to a drain thereof, and wherein the output current detection circuit includes: a second transistor that receives the differential signal at a gate thereof, and sends out the mirror current from a second output node connected to a drain thereof; and a variable resistance that is connected to the second output node and that generates the output current detection signal at the second output node upon receiving the mirror current. (As used herein, the terminology "is occurring" encompasses "has occurred.")

Alternatively, a display driver of the present invention includes: first to n-th (n is an integer of 2 or greater) amplifier circuits that receive first to n-th gradation voltages each having a voltage value corresponding to a luminance level of each pixel indicated by a video signal, generate first to n-th output currents that are electric currents corresponding to a size of change in voltage values of the respective first to n-th gradation voltages, and supply the first to n-th output voltages having voltage values corresponding to the respective first to n-th gradation voltages to the first to n-th source lines by outputting the generated first to n-th output currents to first to n-th source lines of a display panel, respectively; first to n-th output current detection circuits that generate first to n-th mirror currents by copying the first to n-th output currents, and output first to n-th output current detection signals each having a level corresponding to a current size of each of the first to n-th mirror currents; and a failure determination circuit that determines whether a short circuit failure or current leak failure is occurring in the first to n-th source lines or not based on the first to n-th output current detection signals outputted from the first to n-th output current detection circuits, wherein each of the first to n-th amplifier circuits includes: a differential unit that generates a differential signal that represents a difference between the gradation voltage and the output voltage; and a first transistor that receives the differential signal at a gate thereof, and sends out the output current from a first output node connected to a drain thereof, and wherein each of the first to n-th output current detection circuits includes a second transistor that receives the differential signal at a gate thereof, and sends out the mirror current from a second output node connected to a drain thereof; and a variable resistance that is connected to the second output node and that generates the output current detection signal at the second output node upon receiving the mirror current.

A display device of the present invention includes: a display panel having first to n-th (n is an integer of 2 or greater) source lines and a plurality of gate lines intersecting with each other and display cells disposed at respective intersections, and a display driver that drives the display panel in accordance with a video signal, wherein the display driver includes: first to n-th amplifier circuits that receive first to n-th gradation voltages each having a voltage value corresponding to a luminance level of each pixel indicated by a video signal, generate first to n-th output currents that are electric currents corresponding to a size of change in voltage values of the respective first to n-th gradation voltages, and supply the first to n-th output voltages having voltage values corresponding to the respective first to n-th gradation voltages to the first to n-th source lines by outputting the generated first to n-th output currents to the first to n-th source lines, respectively; first to n-th output current detection circuits that generate first to n-th mirror currents by copying the first to n-th output currents, and output first to n-th output current detection signals each having a level corresponding to a current size of each of the first to n-th mirror currents; and a failure determination circuit that determines whether a short circuit failure or current leak failure is occurring in the first to n-th source lines or not individually by comparing a level of the first to n-th output current detection signals outputted from the first to n-th output current detection circuits with a prescribed threshold value, respectively, wherein each of the first to n-th amplifier circuits includes a differential unit that generates a differential signal that represents a difference between the gradation voltage and the output voltage; and a first transistor that receives the differential signal at a gate thereof, and sends out the output current from a first output node connected to a drain thereof, and wherein each of the first to n-th output current detection circuits includes a second transistor that receives the differential signal at a gate thereof, and sends out the mirror current from a second output node connected to a drain thereof; and a variable resistance that is connected to the second output node and that generates the output current detection signal at the second output node upon receiving the mirror current.

Alternatively, a display driver of the present invention includes first to n-th (n is an integer of 2 or greater) amplifier circuits that receive first to n-th gradation voltages each having a voltage value corresponding to a luminance level of each pixel indicated by a video signal, generate first to n-th output currents that are electric currents corresponding to a size of change in voltage values of the respective first to n-th gradation voltages, and supply the first to n-th output voltages having voltage values corresponding to the respective first to n-th gradation voltages to the first to n-th source lines by outputting the generated first to n-th output currents to first to n-th source lines of a display panel, respectively; a failure determination circuit that determines whether a short circuit failure or current leak failure is occurring in the first to n-th source lines or not; and a common wiring line connected to each of the first to n-th amplifier circuits, wherein each of the first to n-th amplifier circuits includes: a differential unit that generates a differential signal that represents a difference between the gradation voltage and the output voltage; a first transistor that receives the differential signal at a gate thereof, and sends out the output current from a drain thereof; and a second transistor that receives the differential signal at a gate thereof, and sends out a mirror current that is a copy of the output current sent from the first transistor to the common wiring line, and wherein the failure determination circuit includes: a variable resistance that is connected to the common wiring line and that generates an output current detection signal at the common wiring upon receiving a combined current of the mirror currents sent from the second transistors of the respective amplifier circuits via the common wiring line; and a comparator that determines whether a short-circuit failure or a current leak failure is occurring in the first to n-th source lines by comparing a level of the output current detection signal with a prescribed threshold value.

Alternatively, a display driver of the present invention includes: first to n-th amplifier circuits that receive first to n-th gradation voltages each having a voltage value corresponding to a luminance level of each pixel indicated by a video signal, generate first to n-th output currents that are electric currents corresponding to a size of change in voltage values of the respective first to n-th gradation voltages, and supply the first to n-th output voltages having voltage values corresponding to the respective first to n-th gradation voltages to the first to n-th source lines by outputting the generated first to n-th output currents to first to n-th source lines of a display panel, respectively; a failure determination circuit that determines whether a short circuit failure or current leak failure is occurring in the first to n-th source lines or not; and first to k-th common wiring lines each connected to one of the first to k-th (k is an integer of 2 or greater and smaller than n) amplifier circuit groups obtained by dividing the first to n-th amplifier circuits into first to k-th amplifier circuit groups each having at least one of the amplifier circuits, wherein each of the first to n-th amplifier circuits includes: a differential unit that generates a differential signal that represents a difference between the gradation voltage and the output voltage; a first transistor that receives the differential signal at a gate thereof, and sends out the output current from a drain thereof; and a second transistor that receives the differential signal at a gate thereof, and sends out a mirror current that is a copy of the output current sent from the first transistor to one common wiring line connected to the amplifier circuit group having the second transistor, out of the first to k-th common wiring lines, wherein the failure determination circuit includes: a multiplexer that selects one of the first to k-th common wiring lines and connect the selected common wiring to an output node; a variable resistance that is connected to the output node and that generates an output current detection signal at the output node upon receiving a combined current of the mirror currents sent from the second transistors of the respective amplifier circuits via the selected common wiring line, the multiplexer, and the output node; and a comparator that determines whether a short-circuit failure or a current leak failure is occurring in the first to n-th source lines by comparing a level of the output current detection signal with a prescribed threshold value.

The present invention is a display driver that includes an amplifier that supplies an output voltage to each source line of a display panel by outputting, to the source line, an output current based on a gradation voltage corresponding to a luminance level indicated by a video signal, and the display driver is further provided with the following output current detection circuit and failure determination circuit for detecting a short-circuit failure or a current leak failure in the source line of the display panel.

The output current detection circuit generates a mirror current by copying the output current outputted from the amplifier circuit to the source line, and obtains an output current detection signal representing the mirror current. The failure detection circuit determines whether a short-circuit failure or a current leak failure is occurring in the source lines by comparing a level of the output current detection signal with a prescribed threshold value.

The output current detection circuit includes a transistor that receives a differential signal representing a difference between the gradation voltage and the output voltage and generated by the differential unit of the amplifier circuit at a gate thereof, and a variable resistance that generates an output current detection signal as a result of the mirror current flowing into and that adjusts the level of this output current detection signal.

By adjusting the level of the output current detection signal with the variable resistance in accordance with the size of the current leak expected based on the size of the display panel, or the length, material, or the like of each source line, it is possible to accurately detect a failure using a prescribed threshold value regardless of the size of current leak.

Thus, even if the size of current leak occurring in a source line of the display panel is very small, this current leak can be accurately detected as a failure.

Furthermore, the output current detection circuit generates a mirror current by copying the output current outputted from the amplifier circuit based on the differential signal generated by the differential unit of the amplifier circuit, and generates an output current detection signal representing a change in current size of the output current based on the mirror current.

This eliminates the need for connecting current detecting elements such as switches or resistances to the output node of the amplifier circuit, and thus, it is possible to detect a short-circuit failure or current leak failure in source lines of the display panel without increasing the output load.

DETAILED DESCRIPTION OF EMBODIMENTS

Below, embodiments of the present invention will be explained in detail with reference to figures.

Figure 1:
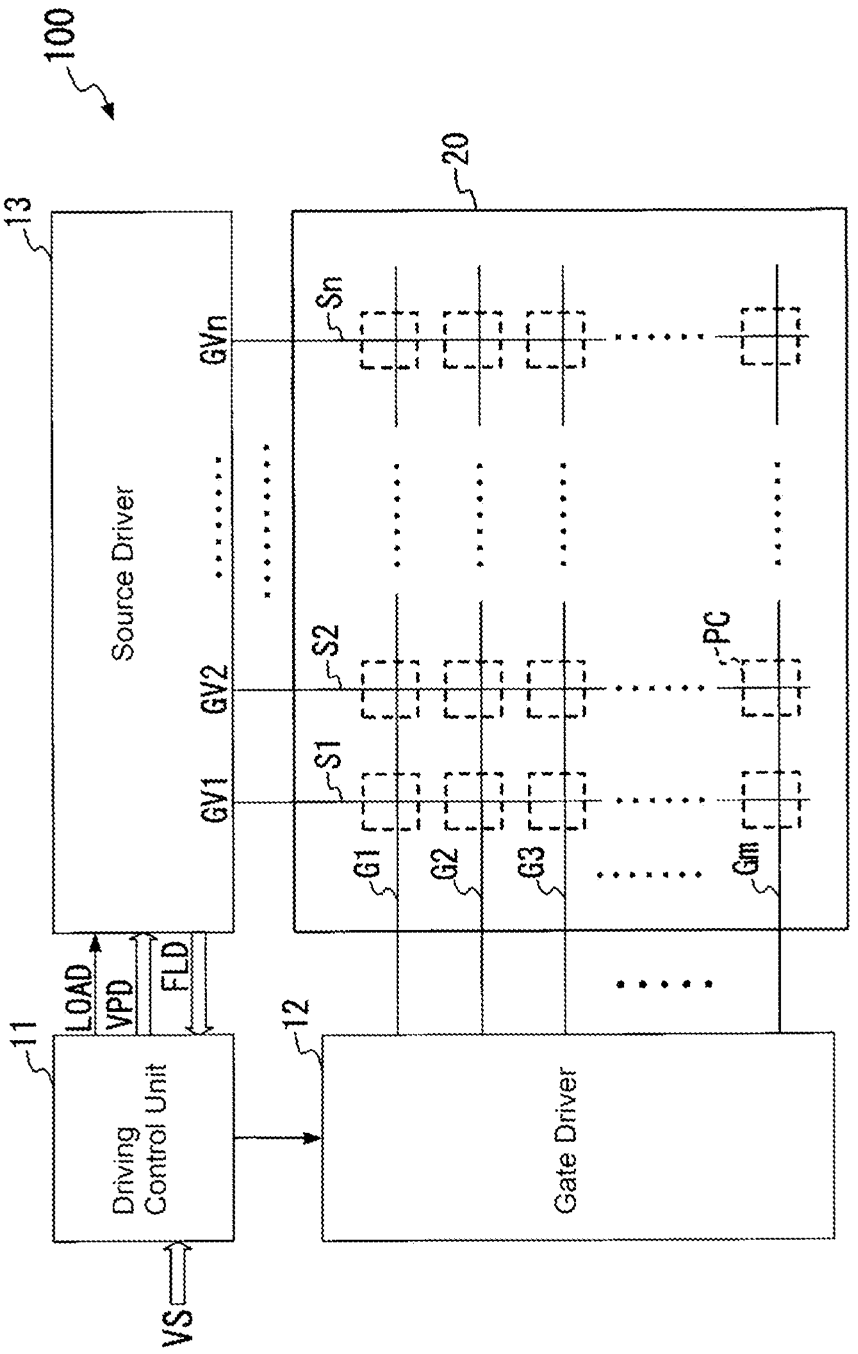
FIG. 1 is a block diagram illustrating a configuration of a display device 100.

FIG. 1 is a block diagram illustrating a configuration of a display device 100 including a display driver of the present invention.

The display device 100 includes a driving control unit 11, a gate driver 12, a source driver 13, and a display panel 20.

The display panel 20 is a liquid crystal panel or an organic EL (electroluminescence) panel, for example. In the display device 20, gate lines G1 to Gm (m is an integer of 2 or greater) extending in the horizontal direction of a two-dimensional screen, and source lines S1 to Sn (n is an integer of 2 or greater) extending in the vertical direction of the two-dimensional screen are arranged to intersect with each other. At each intersection of the gate lines and source lines, a display cell PC made of liquid crystal or organic EL element, or the like is formed.

The driving control unit 11 receives a video signal VS, generates a scanning signal in accordance with a horizontal synchronization signal included in the video signal, and supplies this scanning signal to the gate driver 12.

The driving control unit 11 also generates a video data signal VPD including a series of display data pieces representing a luminance level of each pixel in 8-bit, for example, based on the video signal VS, and various control signals including the data loading signal LOAD, and supplies those signal to the source driver 13.

Figure 2:
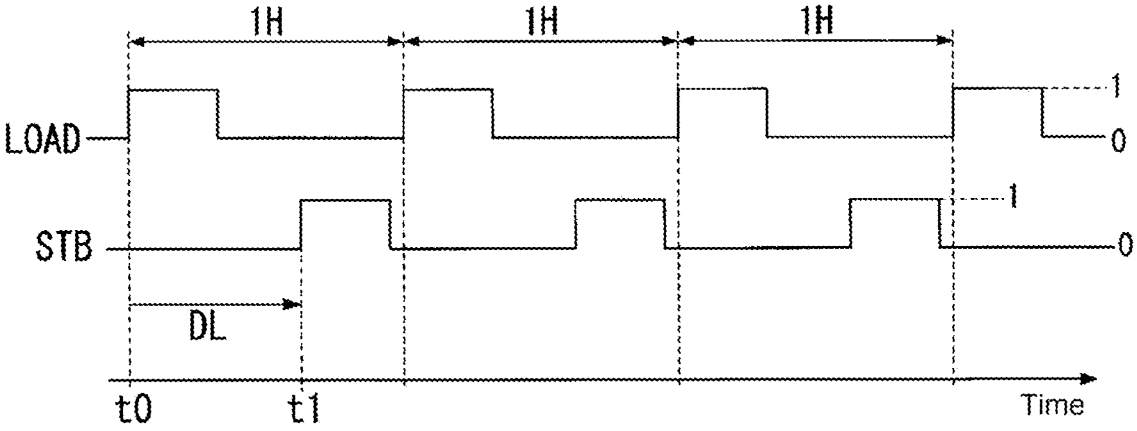
FIG. 2 is a waveform diagram illustrating an example of waveforms of a data loading signal LOAD and a strobe signal STB.

As illustrated in FIG. 2, the data loading signal LOAD is a binary pulse signal (logical level 0 or 1) having the same cycle (1H) as the horizontal synchronization signal.

The driving control unit 11 loads a failure location data signal FLD supplied from the source driver 13 at a certain time interval. The failure location data signal FLD is a signal representing the location of a failure that is occurring in the display panel 20. When the failure location data signal FLD indicates the location of a failure, the driving control unit 11 performs display control or audio output control to notify a user of the occurrence of the failure and the location thereof.

The gate driver 12 generates a scanning pulse in accordance with the scanning signal supplied from the driving control unit 11, and applies this pulse to the gate lines G1 to Gn of the display panel 20 in this order.

The source driver 13 loads a series of display data pieces included in the video data signal VPD in accordance with the data loading signal LOAD. At this time, the source driver 13 repeatedly generates output voltages GV1 to GVn each having a voltage value corresponding to a luminance level represented by each of the display data pieces, after loading an n-number of display data pieces, or in other words, display data pieces for one horizontal scanning line. The source driver 13 supplies the output voltages GV1 to GVn to the source lines S1 to Sn of the display panel 20.

Furthermore, the source driver 13 detects a failure occurring in the source lines S1 to Sn of the display panel 20, and supplies the failure location data signal FLD, which is a signal indicating the location of the failure, to the driving control unit 11.

Figure 3:
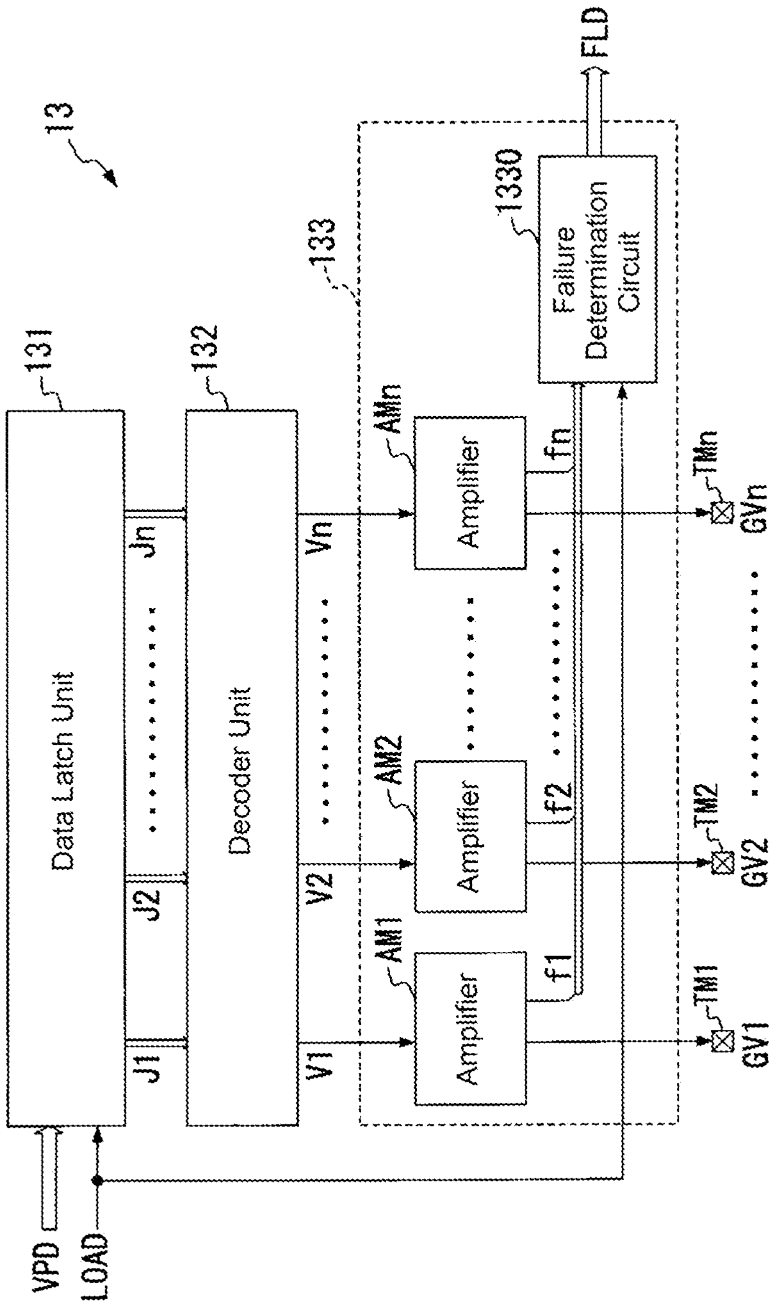
FIG. 3 is a block diagram illustrating an example of an internal configuration of a source driver 13.

FIG. 3 is a block diagram illustrating an example of the internal configuration of the source driver 13.

As illustrated in FIG. 3, the source driver 13 includes a data latch unit 131, a decoder unit 132, and an output amplifier unit 133.

The data latch unit 131 loads a series of display data pieces corresponding to each pixel included in the video data signal VPD at a timing corresponding to the front edge part of the data loading signal LOAD, for example.

Then after loading an n-number of display data pieces for one horizontal scanning line, the data latch unit 131 supplies those display data pieces to the decoder unit 132 as display data J1 to Jn at a timing corresponding to the front edge part of the data loading signal LOAD, for example.

The decoder unit 132, for each piece of display data J1 to Jn, selects a gradation voltage corresponding to the luminance level indicated by the display data Jq (q is an integer of 1 through n), from 256 gradation voltages each having a different voltage value, for example. The decoder unit 132 then supplies an n-number of gradation voltages selected in this manner based on the display data J1 to Jn to the output amplifier unit 133 as the gradation voltages V1 to Vn.

The output amplifier unit 133 includes amplifiers AM1 to AMn disposed for the respective source lines S1 to Sn of the display panel 20, and a failure determination circuit 1330.

The amplifiers AM1 to AMn respectively receive the gradation voltages V1 to Vn, and generate output voltages GV1 to GVn each having a voltage value corresponding to the value of each gradation voltage, by respectively amplifying the gradation voltages V1 to Vn. External terminals TM1 to TMn are respectively connected to the source lines S1 to Sn of the display panel 20. The amplifiers AM1 to AMn supply the generated output voltages GV1 to GVn to the source lines S1 to Sn via the external terminals TM1 to TMn.

Furthermore, the amplifiers AM1 to AMn detect an output current sent to each of the source lines S1 to Sn, and supplies output current detection signals f1 to fn, each representing the size of the output current for each of the source lines S1 to Sn, to the failure determination circuit 1330.

The amplifiers AM1 to AMn have the same internal configuration as each other. Below, the internal configuration of the amplifier AM1 will be explained as an example of the amplifiers AM1 to AMn.

Figure 4:
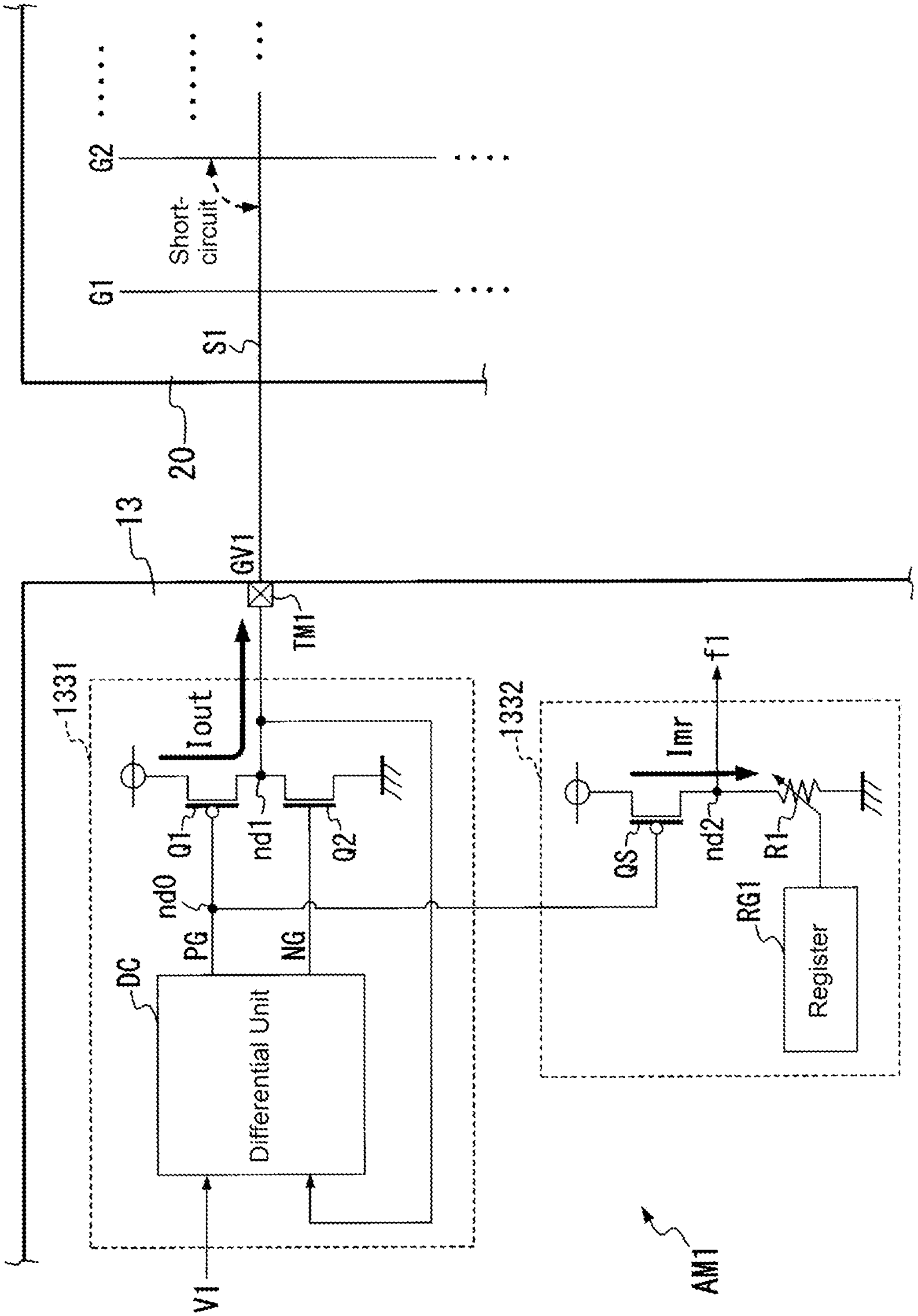
FIG. 4 is a circuit diagram illustrating an internal configuration of an amplifier AM1.

FIG. 4 is a circuit diagram illustrating an example of the internal configuration of the amplifier AM1.

As illustrated in FIG. 4, the amplifier AM1 includes an amplifier circuit 1331 and an output current detection circuit 1332.

The amplifier circuit 1331 is an operational amplifier of a voltage follower, for example, and includes a differential unit DC, a transistor Q1, which is a p-channel MOS-type output transistor, and a transistor Q2, which is an N-channel MOS-type output transistor.

The differential unit DC receives the output voltage GV1 outputted from the amplifier circuit 1331 and the gradation voltage V1 described above, and generates a differential signal PG having a level corresponding to a difference between the two voltage values. The differential unit DC supplies the generated differential signal PG to the gate of the transistor Q1, which is a positive-side output transistor, and the output current detection circuit 1332 via a node nd0. Furthermore, the differential unit DC supplies an inverted differential signal NG obtained by inverting the phase of the differential signal PG to the gate of the transistor Q2, which is a negative-side output transistor.

That is, when the gradation voltage V1 is higher than the output voltage GV1, or in other words, when the output voltage is ramping up, the level of the differential signal PG generated by the differential unit DC becomes higher as the difference between the two is greater. When the gradation voltage V1 is lower than the output voltage GV1, or in other words, when the output voltage is falling, the level of the inverted differential signal NG generated by the differential unit DC becomes higher as the difference between the two is greater.

The source of the transistor Q1 is applied with a power source potential, and the drain thereof is connected to the drain of the transistor Q2 and the external terminal TM1 via an output node nd1. The source of the transistor Q2 is applied with a ground potential.

The transistor Q1 generates an output current Iout corresponding to the differential signal PG received at the gate thereof, and sends out the output current Iout to the external terminal TM1 via the output node nd1. The transistor Q2 extracts, from the output node nd1, a current (referred to as an extraction current) corresponding to the inverted differential signal NG received at the gate thereof. With this operation, the output voltage GV1 having a voltage value corresponding to the inputted gradation voltage V1 is generated at the output node nd1 and the external terminal TM1.

For example, the external terminal TM1 connected to the amplifier circuit 1331 of the amplifier AM1 is connected to the source line S1 of the display panel 20 as illustrated in FIG. 4. Thus, the amplifier AM1 supplies the output voltage GV1 generated in the manner described above to the source line S1 of the display panel 20. Similarly, the external terminal TMj (j is an integer of any one of 2 to n) connected to the amplifier circuit 1331 of the amplifier AMj is connected to the source line Sj of the display panel 20, and supplies the output voltage GVj generated therein to the source line Sj.

The output current detection circuit 1332 detects an output current outputted to the source line connected to the amplifier circuit 1331, and generates an output current detection signal representing the size of the output current as a level of a voltage value. For example, the output current detection circuit 1332 of the amplifier AM1 detects an output current Iout sent from the amplifier circuit 1331 to the source line S1, and generates an output current detection signal f1 representing the current size as a level of a voltage value. Similarly, the output current detection circuit 1332 of the amplifier AMj (j is an integer of any one of 2 to n) detects an output current sent from the amplifier circuit 1331 to the source line Sj, and generates an output current detection signal fj representing the current size as a level of a voltage value.

As illustrated in FIG. 4, the output current detection circuit 1332 includes a p-channel MOS-type transistor QS, a register RG1, and a variable resistance R1.

The source of the transistor QS is applied with a power source potential, and the gate thereof receives the differential signal PG via the node nd0. That is, in a manner similar to the transistor's Q1, the transistor QS receives the differential signal PG generated by the differential unit DC at the gate thereof. The drain of the transistor QS is connected to one end of the variable resistance R1 via an output node nd2. The ground potential is applied to the other end of the variable resistance R1, and the resistance value thereof can be adjusted by the adjustment value held by the register RG1.

With this configuration, the transistor QS generates a current corresponding to the differential signal PG received at the gate thereof, or in other words, a mirror current corresponding to the output current outputted from the transistor Q1 of the amplifier circuit 1331, and sends out this current to the variable resistance R1 via the output node nd2. Therefore, a voltage signal generated at the output node nd2 as a result of the mirror current flowing into the variable resistance R1 is generated as the output current detection signal f that represent a change in current size of the output current sent to the source line as a voltage level. In other words, the mirror current flows into the variable resistance R1, causing the output current detection signal that changes in accordance with the flow-in amount to be generated at the output node nd2.

Then, the output current detection circuits 1332 in the respective amplifiers AM1 to AMn supply, to the failure detection circuit 1330, the output current detection signals f1 to fn representing the size of output currents respectively sent to the source lines S1 to Sn.

The respective levels of the output current detection signals f1 to fn may be adjusted with the adjustment value held at the register RG1 by the variable resistance R1. For example, taking into consideration an increase in output current caused by current leak, which is likely to occur if a source line and a gate line of the display panel 20 are short-circuited, the adjustment value is given to the register RG1 in advance so that this current increase can be detected as a failure by the failure determination circuit 1330.

The failure determination circuit 1330 determines whether a short-circuit failure or current leak failure is occurring in the source lines S1 to Sn of the display panel 20 or not based on the output current detection signals f1 to fn, and generates a failure location data signal FLD indicating the source line having the failure.

Specifically, the failure determination circuit 1330 compares the level of the output current detection signal with a prescribed threshold value Vth for failure detection at the time t1 after a prescribed period of time DL has passed since the time t0, which is the front edge of the data loading signal LOAD as illustrated in FIG. 2. If the level of the output current detection signal is greater than the threshold value Vth, the failure determination circuit 1330 determines that a short-circuit failure or a current leak failure is occurring in the source line corresponding to this output current detection signal. On the other hand, if the level of the output current detection signal is equal to or smaller than the threshold value Vth, the failure determination circuit 1330 determines that a short-circuit failure or a current leak failure is not occurring in the source line corresponding to the output current detection signal. Then the failure determination circuit 1330 generates a failure location data signal FLD indicating the determination result obtained by performing the determination process described above for each of the output current detection signals.

Below, the failure determination operation by the amplifier circuit 1331, the output current detection circuit 1332, and the failure determination circuit 1330 described above will be explained with reference to FIGS. 4 and 5.

Figure 5:
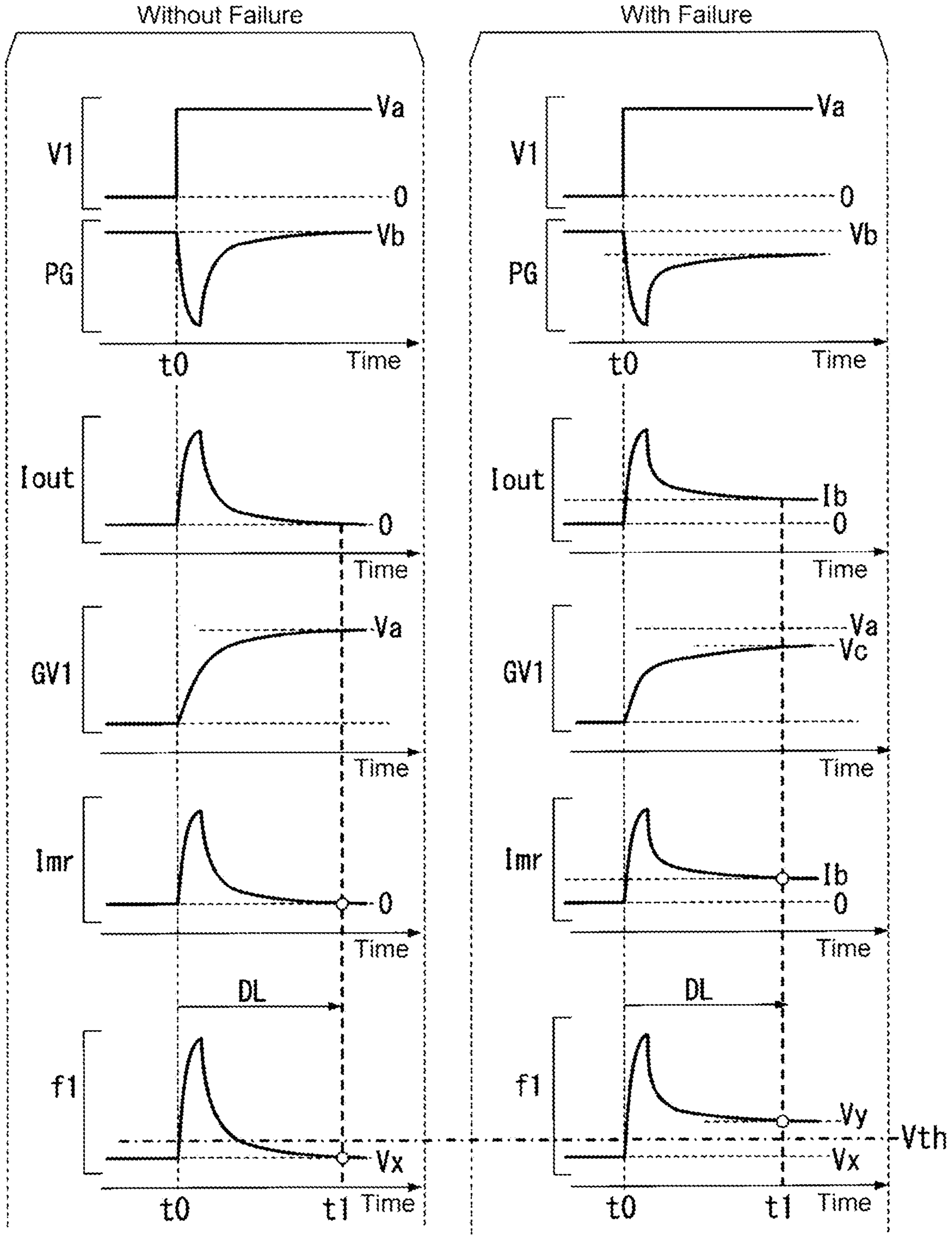
FIG. 5 is a diagram illustrating operation waveforms inside the amplifier AM1 for a case in which a short-circuit failure or current leak failure is occurring in the source line S1 of the display panel 20 and for a case in which such a failure is not occurring.

FIG. 5 is a diagram illustrating operation waveforms inside the amplifier AM1 illustrated in FIG. 4 for a case in which a short-circuit failure or current leak failure is occurring in the source line S1 of the display panel 20 and for a case in which such a failure is not occurring. Also, FIG. 5 illustrates the operation waveforms when the voltage of the gradation voltage V1 supplied to the amplifier AM1 changes from the voltage value 0 to the voltage value Va at the timing (time t0) corresponding to the front edge of the data loading signal LOAD.

(Case in which Failure is not Present)

As illustrated in FIG. 5, when the gradation voltage V1 changes from the voltage value 0 to the voltage value Va (Va>0) at the time t0, the differential unit DC of the amplifier circuit 1331 sends, to the node nd0, a differential signal PG having a value (0−Va) representing the difference between the output voltage GV1 and the gradation voltage V1. This differential signal PG turns on the transistor Q1, which sends to the source line S1 the output current Iout corresponding to the differential value (0−Va). Then, the voltage on the source line S1, or in other words, the voltage value of the output voltage GV1, gradually increases. As a result, the differential value between the gradation voltage V1 and the output voltage GV1 gradually decreases, and as the voltage value of the differential signal PG gradually returns to the voltage value Vb, the output current Iout gradually goes down. Thereafter, when the voltage value of the output voltage GV1 reaches Va, which is the voltage value of the gradation voltage V1, the voltage value of the differential voltage PG reaches the voltage value Vb that turns the transistor Q1 off. As a result of the transistor Q1 being off, the output current Iout becomes zero.

During this time, the transistor QS of the output current detection circuit 1332 sends out the mirror current Imr that is a copy of the output current Iout as illustrated in FIG. 5 to the variable resistance R1 via the output node nd2. This way, on the output node nd2, a signal representing a change in current size of the mirror current Imr as a change in voltage value, or in other words, the output current detection signal f1 representing a change in current size of the output current Iout illustrated in FIG. 5, is generated.

Here, if the source line S1 of the display panel 20 does not have a short-circuit failure or current leak failure, as illustrated in FIG. 5, the output current Iout becomes zero at the time t1 after the prescribed period of time DL has passed since the time t0. Naturally, the mirror current Imr that is a copy of the output current Iout becomes zero at the time t1 as well, and thus, the level of the output current detection signal f1 corresponding to the mirror current Imr at the time t1 reaches a voltage value Vx representing the current size being zero as illustrated in FIG. 5.

Thus, as illustrated in FIG. 5, because the level of the output current detection signal f1 at the time t1 does not exceed the prescribed threshold value Vth (the one-dot dash line in FIG. 5), the failure determination circuit 1330 generates the failure location data signal FLD indicating that the source line S1 does not have a short-circuit failure or current leak failure.

(Case in which Failure is Present)

Even when a short-circuit failure or current leak failure is occurring in the source line S1, when the gradation voltage V1 changes from the voltage value 0 to the voltage value Va at the time t0, the differential unit DC of the amplifier circuit 1331 sends, to the node nd0, the differential signal PG having a value (0−Va) representing the difference between the output voltage GV1 and the gradation voltage V1. This differential signal PG turns on the transistor Q1, which sends to the source line S1 the output current Iout corresponding to the differential value (0−Va). Then, the voltage on the source line S1, or in other words, the voltage value of the output voltage GV1, gradually increases. As a result, the differential value gradually increases, which causes the voltage value of the differential signal PG to gradually increase, and as the voltage value of the differential signal PG gradually increases, the output current Iout gradually decreases.

At this time, if the source line S1 is short-circuited to at least one of the gate lines G1 to Gn (for example, the gate line G2 as illustrated in FIG. 4), the output current Iout flows into not only the source line S1, but also the gate line G2. That is, part of the output current Iout leaks into the gate line G2 as a leak current. Because the gate line G2, in addition to the source line S1, is charged by the output current Iout, the output voltage GV1 increases more gradually than the case where the source line S1 does not have a short-circuit failure. As a result, as illustrated in FIG. 5, at the time t1, the voltage value of the output voltage GV1 does not reach Va, which is the voltage value of the gradation voltage V1, but instead stays at a voltage value Vc that is lower than the voltage value Va, and therefore, the differential value (Vc−Va) between the output voltage GV1 and the gradation voltage V1 does not become zero. Thus, as illustrated in FIG. 5, the voltage value of the differential signal PG corresponding to the differential value does not reach the voltage Vb that can turn the transistor Q1 off. The transistor Q1 therefore stays on even at the time t1, and as illustrated in FIG. 5, sends out the output current Iout having a current size Ib corresponding to the differential value (Vc−Va) represented by the differential signal PG. This way, the level of the output current detection signal f1 corresponding to the mirror current Imr that is a copy of the output current Iout at the time t1 becomes a voltage value Vy that is higher than the voltage value Vx representing the current size being zero as illustrated in FIG. 5.

Thus, as illustrated in FIG. 5, because the level of the output current detection signal f1 at the time t1 is higher than the prescribed threshold value Vth, the failure determination circuit 1330 generates the failure location data signal FLD indicating that the source line S1 has a short-circuit failure or current leak failure.

As described above in detail, in the display device 100, the source driver 13 is provided with the output current detection circuit 1332 and the failure determination circuit 1330 as a failure detection device that detects a short-circuit failure or a current leak failure of the source lines (S1 to Sn) of the display panel 20.

The output current detection circuit 1332 is included in each of the amplifiers AM1 to AMn, and for each amplifier AM, generates the mirror current Imr that is a copy of the output current Iout sent by that amplifier to the corresponding source line, and sends out this mirror current Imr to the variable resistance R1 via the output node nd2. By the mirror current Imr flowing into the variable resistance R1, a signal obtained by performing a current-voltage conversion on the mirror current Imr, or in other words, the output current detection signal f that represents a change in current size of the mirror current Imr as a change in voltage value is generated at the output node nd2.

As illustrated in FIG. 5, the failure determination circuit 1330 determines that there is a failure if the level of the output current detection signal f is greater than the prescribed threshold value Vth at the time t1 when the prescribed period of time DL has passed since the time t0, at which the voltage value of the inputted gradation voltage changes. If the level of the output current detection signal f is equal to or smaller than the threshold value Vth, it is determined that no failure is present.

As described above, the failure detection device (1332, 1330) detects a failure using the threshold value Vth, based on the fact that, when the operation amplifier (1331) of voltage follower is used for the output amplifier of the source driver, a short-circuit failure or current leak failure would cause the mirror current Imr (Iout) to be higher compared to a case in which such a failure does not exist.

In the output current detection circuit 1332, because of the variable resistance R1 working as a resistance for obtaining the output current detection signal from the mirror current Imr, it is possible to adjust the level of the output current detection signal.

Therefore, by adjusting the level of the output current detection signal in accordance with the size of the current leak expected based on the size of the display panel, or the length, material, or the like of each source line, it is possible to accurately detect a failure using a fixed threshold value Vth regardless of the size of current leak.

This makes it possible for the failure detection device (1332, 1330) to accurately detect even a very small current leak occurring in a source line of the display panel 20 as a failure.

Furthermore, the output current detection circuit 1332 is provided with the transistor QS that receives, at the gate thereof as in the output transistor (Q1), the differential signal PG generated by the differential unit DC of the amplifier circuit 1331, in order to detect the output current Iout outputted to the source line.

That is, in the output current detection circuit 1332, the output current Iout is copied by the transistor QS, and by sending the resultant mirror current Imr to the resistance (R1), the output current is detected. This eliminates the need of connecting current detecting elements such as switches or resistances to the output node nd1 of the amplifier circuit 1331 for detecting a failure (short-circuit, current leak), and therefore, it is possible to detect a short-circuit failure or current leak failure in a source line of the display panel 20 without increasing the output load of the amplifier.

The failure determination circuit 1330 may alternatively be configured such that all of the source lines are divided into a plurality of source line groups, and a failure detection is performed on one source line that represents each source line group, instead of performing a failure detection on each of the source lines S1 to Sn individually.

Figure 6:
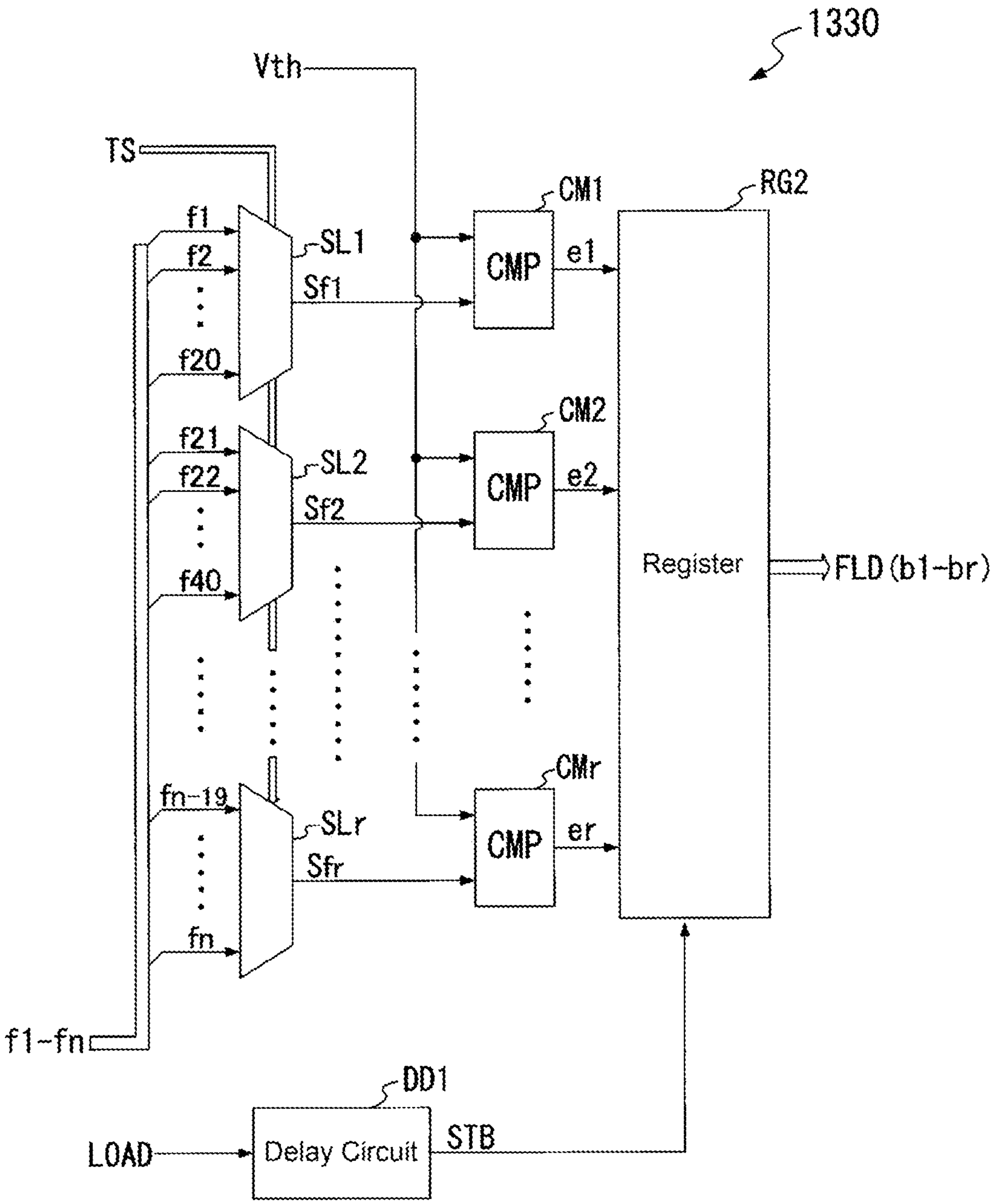
FIG. 6 is a circuit diagram illustrating an internal configuration of a failure determination circuit 1330.

FIG. 6 is a block illustrating the internal configuration of the failure determination circuit 1331 made in view of this point. In the configuration illustrated in FIG. 6, the source lines S1 to Sn are divided into first to r-th (r is an integer of 2 or greater) source line groups each made up of 20 adjacent source lines, for example, and the failure detection is performed on any one source line that represents each of the first to r-th source line groups.

The failure determination circuit 1330 illustrated in FIG. 6 includes selectors SL1 to SLr (r is an integer of 2 or greater), comparators CM1 to CMr, a delay circuit DD1, and a register RG2.

Each of the selectors SL1 to SLr receives output current detection signals for 20 lines each, among the output current detection signals f1 to fn. Each of the selectors SL1 to SLr selects one output current detection signal indicated by a representative source line designation signal TS from those output current detection signals for 20 lines, and outputs this one signal as a representative output current detection signal Sf. That is, the selectors SL1 to SLr respectively supply, to the corresponding comparators CM1 to CMr, the representative output current detection signals Sf1 to Sfr selected respectively based on the representative source line designation signal TS.

Each of the comparators CM1 to CMr compares the level of the received representative output current detection signal Sf with the prescribed threshold value Vth for failure determination. If the level of the representative output current detection signal Sf is greater than the threshold value Vth, the comparators CM1 to CMr generate a preliminary failure determination signal indicating that there is a failure, and if the level is equal to or lower than the threshold value Vth, generate a preliminary failure determination signal indicating that there is not a failure. Then the comparators CM1 to CMr supply the respective preliminary failure determination signals to the register RG2 as preliminary failure determination signals e1 to er.

The delay circuit DD1 receives the data loading signal LOAD, and supplies to the register RG2 a strobe signal STB, which is a signal obtained by delaying the data loading signal LOAD by a prescribed period of time DL as illustrated in FIG. 2.

The register RG2 takes in preliminary failure determination signals e1 to er supplied from the comparators CM1 to CMr at the timing corresponding to the front edge of the strobe signal STB illustrated in FIG. 2. The register RG2 outputs a failure location data signal FLD including those preliminary failure determination signals e1 to er as the failure determination signals b1 to br.

Here, if the failure determination signal b1 indicates that there is a failure, for example, this means that a short-circuit failure or a current leak failure is occurring in the first source line group (S1 to S20) corresponding to the output current detection signal group (f1 to f20, for example) to which the representative output current detection signal Sf1 belongs, which corresponds to the failure determination signal b1. Also, if the failure determination signal b2 indicates that there is a failure, for example, this means that a short-circuit failure or a current leak failure is occurring in the second source line group (S21 to S40) corresponding to the output current detection signal group (f21 to f40, for example) to which the representative output current detection signal Sf2 belongs, which corresponds to the failure determination signal b2.

As such, in the configuration illustrated in FIG. 6, the output current detection signals f1 to fn corresponding to the source lines S1 to Sn are divided into the first to r-th output current detection signal groups each of which is made up of 20 output current detection signals, for example. Then, one representative output current detection signal is selected from each one of the first to r-th output current detection signal groups, and the level of the selected output current detection signal is compared with the threshold value Vth. This way, a process to determine whether a short-circuit failure or current leak failure is occurring or not is performed for each source line group corresponding to the output current detection signal group to which the selected output current detection signal belongs.

In the embodiment described above, the output current detection signal f that indicates the size of the output current Iout is generated by converting the mirror current Imr, which is a copy of the output current Iout, to a voltage level by the variable resistance R1 in the output current detection circuit 1332 included in each of the amplifiers AM1 to AMn.

However, a configuration may be adopted in which the source driver 13 is provided with one pair of the variable resistance R1 and the register RG1 included in the output current detection circuit 1332, and the drains of the transistors QS in the respective amplifiers AM1 to AMn are commonly connected to one end of the variable resistance R1 using a signal wiring line.

Figure 7:
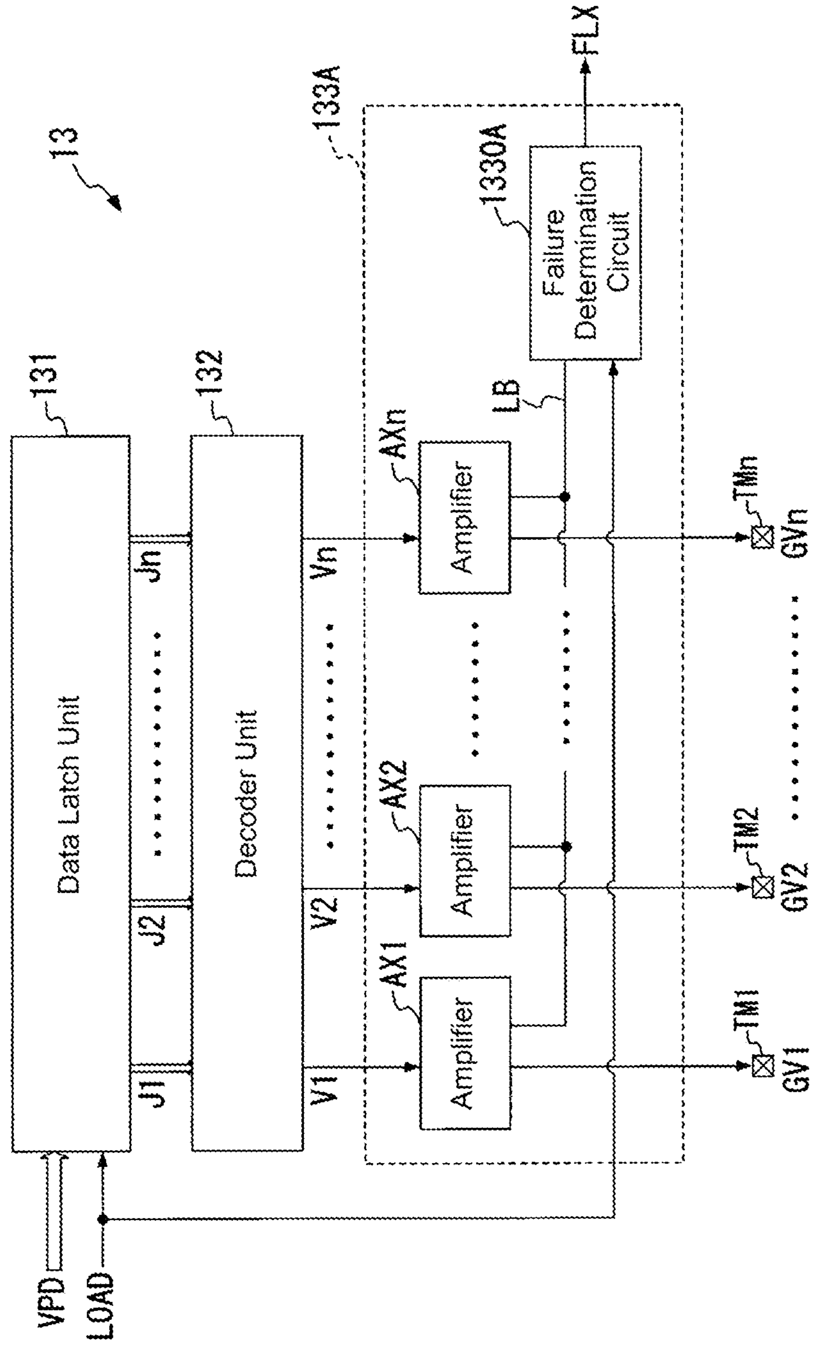
FIG. 7 is a block diagram illustrating another example of an internal configuration of the source driver 13.

FIG. 7 is a block diagram illustrating another example of the internal configuration of the source driver 13.

Except that an output amplifier unit 133A replaces the output amplifier unit 133, the configurations illustrated in FIG. 7, namely the data latch unit 131 and the decoder unit 132, are the same as those illustrated in FIG. 3, and thus, the descriptions thereof are omitted.

In the output amplifier unit 133A, the amplifiers AM1 to AMn illustrated in FIG. 3 are replaced by amplifiers AX1 to AXn, and the failure determination circuit 1330 illustrated in FIG. 3 is replaced by a failure determination circuit 1330A.

In a manner similar to the amplifiers' AM1 to AMn, the amplifiers AX1 to AXn receive the gradation voltages V1 to Vn, amplify the respective voltages to generate the output voltages GV1 to GVn, and supply the generated output voltages GV1 to GVn to the source lines S1 to Sn via the external terminals TM1 to TMn.

The amplifiers AM1 to AMn have the same internal configuration as each other. Below, the internal configuration of the amplifier AX1 will be explained as an example of the amplifiers AX1 to AXn.

Figure 8:
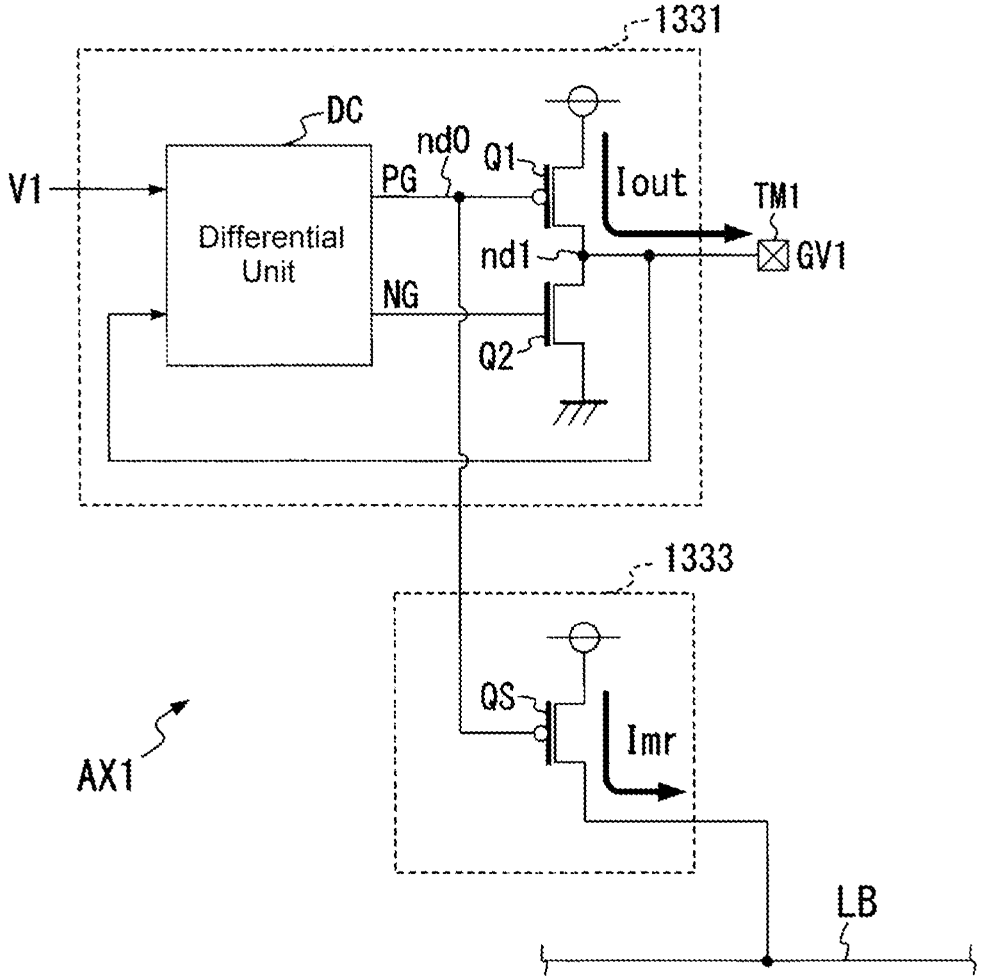
FIG. 8 is a circuit diagram illustrating an internal configuration of an amplifier AX1.

FIG. 8 is a circuit diagram illustrating an example of the internal configuration of the amplifier AX1.

As illustrated in FIG. 8, the amplifier AX1 includes an amplifier circuit 1331 similarly to the amplifier AM1. However, in the amplifier AX1, the output current detection circuit 1332 illustrated in FIG. 4 is replaced with a mirror current generation circuit 1333.

The configuration and operation of the amplifier circuit 1331 illustrated in FIG. 8 are the same as those of the amplifier circuit 1331 illustrated in FIG. 4, and thus, the descriptions thereof are omitted.

The mirror current generation circuit 1333 includes a p-channel MOS-type transistor QS that receives a power source potential at its source. The gate of the transistor QS is connected to the gate of the transistor Q1 of the amplifier circuit 1331 via the node nd0, and the gate receives the differential signal PG outputted from the differential unit DC. The drain of the transistor QS is connected a common wiring line LB. The drain of the transistor QS in each of the amplifiers AX2 to AXn is also connected the common wiring line LB.

With this configuration, the transistor QS generates a current corresponding to the differential signal PG received at the gate thereof, or in other words, the mirror current Imr corresponding to the output current outputted from the transistor Q1 of the amplifier circuit 1331, and sends out this current to the common wiring line LB.

The failure determination circuit 1330A determines whether a short-circuit failure or current leak failure is occurring in the source lines S1 to Sn of the display panel 20 or not based on the current outputted to the common wiring line LB at a timing corresponding to the data loading signal LOAD. Then the failure determination circuit 1331A outputs a failure detection signal FLX indicating whether a failure is occurring or not, as the determination result.

Figure 9:
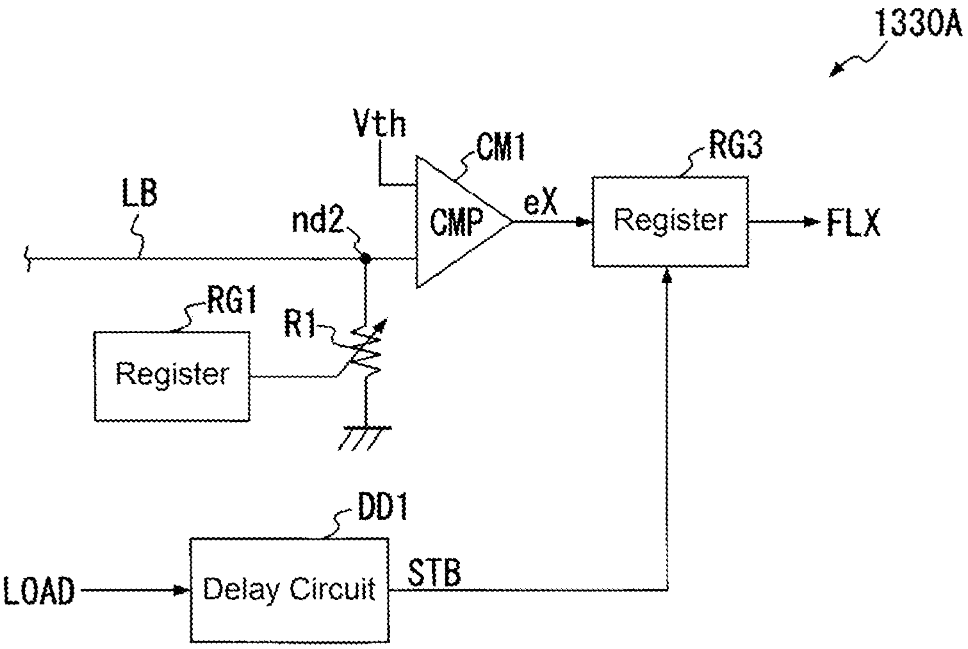
FIG. 9 is a circuit diagram illustrating an internal configuration of a failure determination circuit 1330A.

FIG. 9 is a circuit diagram illustrating an example of the internal configuration of the failure determination circuit 1330A.

As illustrated in FIG. 9, the failure determination circuit 1330A includes a register RG1, a variable resistance R1, a comparator CM1, a register RG3, and a delay circuit DD1.

One end of the variable resistance R1 is connected to the common wiring line LB, and the other end is applied with a ground potential. This way, the combined current obtained by combining the mirror current Imr outputted from each of the transistors QS of the respective amplifiers AX1 to AXn flows into the variable resistance R1 via the common wiring line LB. Then, the variable resistance R1 converts this combined current flowing therein through the common wiring line LB to a voltage level corresponding to the current size, and generates a signal having this voltage level at the common wiring line LB as the output current detection signal.

The register RG1 holds an adjustment value indicating the resistance value of the variable resistance R1. The register RG1 sets the resistance value of the variable resistance R1 by the adjustment value held therein.

The comparator CM1 compares the voltage of the common wiring line LB, or in other words, the above-mentioned output current detection signal with the threshold value Vth, and if the voltage level of the voltage output current detection signal is greater than the threshold value Vth, the comparator CM1 generates a failure determination signal eX indicating that there is a failure, and if the level is equal to or lower than the threshold value Vth, generates a failure determination signal eX indicating that a failure does not exist. The comparator CM1 supplies the generated failure determination signal eX to the register RG3.

The delay circuit DD1 receives the data loading signal LOAD, and supplies to the register RG3 a strobe signal STB, which is a signal obtained by delaying the data loading signal LOAD by a prescribed period of time DL as illustrated in FIG. 2.

The register RG3 takes in the failure determination signal eX supplied from the comparator CM1 at the timing corresponding the front edge of the strobe signal STB illustrated in FIG. 2. The register RG3 holds a signal indicating the level of the received failure determination signal eX, and at the same time, supplies this signal to the driving control unit 11 as a failure detection signal FLX indicating whether a short-circuit failure or a current leak failure is occurring in the source line group (S1 to Sn).

The combined current obtained by combining the mirror current Imr, which is a copy of the output current Iout outputted from the transistors QS of the respective amplifiers AX1 to AXn, flows into the common wiring line LB. If a short-circuit failure or a current leak failure is occurring in at least one of the source lines S1 to Sn, the mirror current Imr (=Iout) at the time t1 in FIG. 5 becomes higher compared to a case in which a short-circuit failure or a current leak failure is not occurring in any one of the source lines S1 to Sn.

Thus, the register RG1 is given the adjustment value for adjusting the resistance value of the variable resistance R1 so that it is possible to differentiate the case a short-circuit failure or a current leak failure is occurring in one of the source lines S1 to Sn from the case in which a short-circuit failure or a current leak failure is not occurring in any one of the source lines S1 to Sn using the threshold value Vth.

As described above, with the configuration illustrated in FIGS. 7 to 9, it is possible to detect a short-circuit failure or a current leak failure that is occurring in at least one of the source lines S1 to Sn. Although it is not possible to identify the particular source line having such a failure with the configuration illustrated in FIGS. 7 to 9, the device size can be made smaller than the case in which the configuration illustrated in FIGS. 3, 4, and 6 is employed.

Using a plurality of common wiring lines LB in the configuration of FIGS. 7 to 9 makes it possible to identify a group of source lines having a failure.

Figure 10:
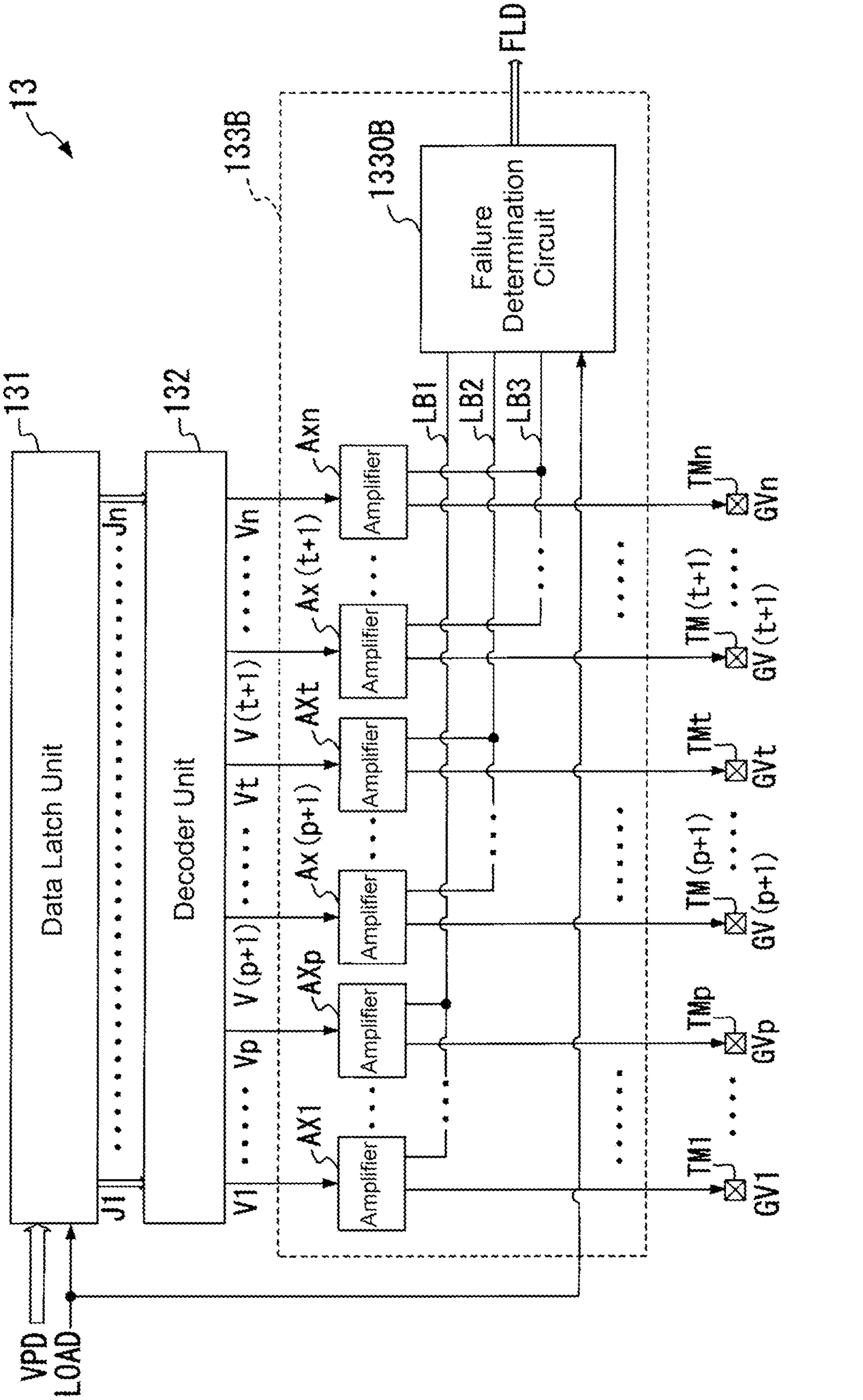
FIG. 10 is a block diagram illustrating yet another example of an internal configuration of the source driver 13.

FIG. 10 is a block diagram illustrating an example of the internal configuration of the source driver 13 as an application example of the configuration illustrated in FIGS. 7 to 9, made in view of the point described above.

Except that an output amplifier unit 133B replaces the output amplifier unit 133, the configurations illustrated in FIG. 10, namely the data latch unit 131 and the decoder unit 132, are the same as those illustrated in FIG. 3, and thus, the descriptions thereof are omitted.

The output amplifier unit 133B includes amplifiers AX1 to AXn similar to those in FIG. 7, common wiring lines LB1 to LB3, and a failure determination circuit 1330B. Because the amplifiers AX1 to AXn are the same as those illustrated in FIG. 7, and the descriptions thereof are omitted.

However, in the amplifiers AX1 to AXp out of the amplifiers AX1 to AXn (p is an integer of 2 or greater), the drains of the transistors QS are connected to the common wiring line LB1. The drains of the transistors QS of the respective amplifiers AX(p+1) to AXt (t is an integer greater than p) are connected to the common wiring line LB2, and the drains of the transistors QS of the respective amplifiers AX(t+1) to AXn are connected to the common wiring line LB3.

The failure determination circuit 1330B determines whether a short-circuit failure or current leak failure is occurring in the source lines S1 to Sn of the display panel 20 or not based on the current outputted to the common wiring lines LB1 to LB3 at a timing corresponding to the data loading signal LOAD. The failure determination circuit 1330B outputs a failure location data signal FLD that indicates whether or not a failure is occurring in a particular source line group, for each of the first source line group including the source lines S1 to Sp, the second source line group including the source line S(p+1) to St, and the third source line group including the source line S(t+1) to Sn.

Figure 11:
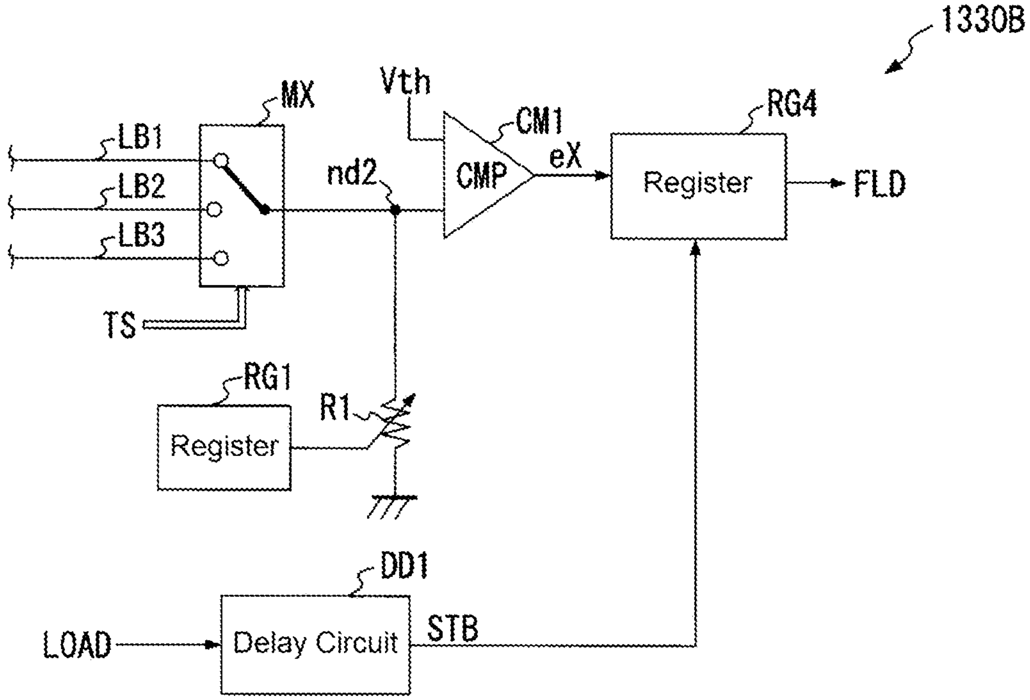
FIG. 11 is a circuit diagram illustrating an internal configuration of a failure determination circuit 1330B.

FIG. 11 is a circuit diagram illustrating the internal configuration of the failure determination circuit 1330B.

As illustrated in FIG. 11, the failure determination circuit 1330B includes a multiplexer MX, registers RG1 and RG4, a variable resistance R1, and a delay circuit DD1.

The multiplexer MX selects one common wiring line at a time from the common wiring lines LB1 to LB3 based on the representative source line designation signal TS, and connects the selected common wiring line to the output node nd2.

One end of the variable resistance R1 is connected to the output node nd2, and the other end is applied with a ground potential. The register RG1 holds an adjustment value indicating the resistance value of the variable resistance R1. The register RG1 sets the resistance value of the variable resistance R1 by the adjustment value held therein.

The comparator CM1 compares the voltage of the output node nd2, or in other words, the voltage of one common wiring line (LB1, LB2 or LB3) selected by the multiplexer MX, with a prescribed threshold value Vth for failure determination. If the voltage of that one common wiring line is greater than the threshold value Vth, the comparator CM1 generates a failure determination signal eX indicating that there is a failure, and if the voltage is equal to or lower than the threshold value Vth, generates the failure determination signal eX indicating that no failure is present. Then the comparator CM1 supplies the generated failure determination signal eX to the register RG4.

The delay circuit DD1 receives the data loading signal LOAD, and supplies to the register RG4 a strobe signal STB, which is a signal obtained by delaying the data loading signal LOAD by a prescribed period of time DL as illustrated in FIG. 2.

The register RG4 takes in the failure determination signal eX supplied from the comparator CM1 at the timing corresponding the front edge of the strobe signal STB illustrated in FIG. 2. The register RG4 holds a signal indicating the level of that failure determination signal eX. That is, the register RG4 holds a signal indicating the level of the failure determination signal eX obtained when the common wiring line LB1 is connected to the comparator CM1 by the multiplexer MX, as the first failure determination signal indicating whether or not a short-circuit failure or a current leak failure is occurring in the first source line group (S1 to Sp). Also, the register RG4 holds a signal indicating the level of the failure determination signal eX obtained when the common wiring line LB2 is connected to the comparator CM1 by the multiplexer MX, as the second failure determination signal indicating whether or not a short-circuit failure or a current leak failure is occurring in the second source line group (S(p+1) to St). Furthermore, the register RG4 holds a signal indicating the level of the failure determination signal eX obtained when the common wiring line LB3 is connected to the comparator CM1 by the multiplexer MX, as the third failure determination signal indicating whether or not a short-circuit failure or a current leak failure is occurring in the third source line group (S(t+1) to Sn).

The register RG4 then supplies, to the driving control unit 11, a failure location data signal FLD for each of the first to third source line groups to indicate whether a failure is occurring in that source line group.

In one example illustrated in FIGS. 10 and 11, the amplifiers AX1 to AXn are divided into three amplifier groups (AX1 to AXp), (AX(p+1) to AXt), and (AX(t+1) to AXn), and three common wiring lines LB1 to LB3 are each used to connect the respective drains of the transistors QS of one amplifier group. However, the number of the common wiring lines is not limited to three. That is, the first to n-th amplifier circuits (AX1 to AXn) may be divided into the first to k-th (k is an integer of 2 or greater but smaller than n) each including at least one amplifier, and the first to k-th common wiring lines may be connected to the first to k-th amplifier circuit groups, respectively.

Also, in the embodiment described above, the delay circuit DD1 generates the strobe signal ST from the data loading signal LOAD, but the driving control unit 11 may directly generate the strobe signal STB.

What is claimed is:

1. A display driver, comprising:

first to n-th amplifier circuits that receive first to n-th (n is an integer of 2 or greater) gradation voltages each having a voltage value corresponding to a luminance level of each pixel indicated by a video signal, generate first to n-th output currents that are electric currents corresponding to a size of change in voltage values of the first to n-th gradation voltages respectively, and supply first to n-th output voltages having voltage values corresponding to the first to n-th gradation voltages respectively to first to n-th source lines of a display panel by outputting the generated first to n-th output currents to the first to n-th source lines of the display panel, respectively;

a failure determination circuit that determines whether a short circuit failure or current leak failure is occurring or has occurred in the first to n-th source lines or not; and a common wiring line connected to each of the first to n-th amplifier circuits, wherein each of the first to n-th amplifier circuits comprises:

a differential unit that generates a differential signal that represents a difference between the gradation voltage and the output voltage;

a first transistor that receives the differential signal at a gate thereof, and sends out an output current from a drain thereof to the common wiring line; and a second transistor that receives the differential signal at a gate thereof, and sends out a mirror current that is a copy of the output current sent from the first transistor to the common wiring line, and wherein the failure determination circuit comprises:

a variable resistance that is connected to the common wiring line and that generates an output current detection signal at the common wiring line upon receiving a combined current of mirror currents sent from second transistors of respective amplifier circuits via the common wiring line; and a comparator that determines whether a short-circuit failure or a current leak failure is occurring or has occurred in the first to n-th source lines by comparing a level of the output current detection signal with a prescribed threshold value.

2. The display driver according to claim 1, further comprising a register that holds an adjustment value, wherein the variable resistance adjusts a level of the output current detection signal in accordance with the adjustment value held by the register.

3. The display driver according to claim 1, further comprising:

a data latch unit that loads and outputs first to n-th display data pieces each representing the luminance level of each pixel based on the video signal at a prescribed point in time; and a decoder unit that converts the first to n-th display data pieces outputted from the data latch unit to an n-number of voltages each having a voltage value corresponding to the luminance level represented by each of the display data pieces, and that supplies the n-number of voltages to the firs to n-th output amplifier circuits as the first to n-th gradation voltages, wherein the failure determination circuit determines whether the short circuit failure or current leak failure is occurring or has occurred in the source lines or not based on a result of comparing a level of the output current detection signal with the prescribed threshold value when a prescribed period of time has passed since the prescribed point in time.

4. The display driver according to claim 3, wherein the failure determination circuit determines that a short-circuit failure or a current leak failure is occurring or has occurred in at least one of the first to n-th source lines when the level of the output current detection signal is greater than the prescribed threshold value.

5. A display driver, comprising:

first to n-th (n is an integer of 2 or greater) amplifier circuits that receive first to n-th gradation voltages each having a voltage value corresponding to a luminance level of each pixel indicated by a video signal, generate first to n-th output currents that are electric currents corresponding to a size of change in voltage values of the first to n-th gradation voltages respectively, and supply first to n-th output voltages having voltage values corresponding to the first to n-th gradation voltages respectively to first to n-th source lines of a display panel by outputting the generated first to n-th output currents to the first to n-th source lines of the display panel, respectively;

a failure determination circuit that determines whether a short circuit failure or current leak failure is occurring or has occurred in the first to n-th source lines or not; and first to k-th common wiring lines each connected to one of the first to k-th (k is an integer of 2 or greater and smaller than n) amplifier circuit groups obtained by dividing the first to n-th amplifier circuits into first to k-th amplifier circuit groups each having at least one of the amplifier circuits, wherein each of the first to n-th amplifier circuits comprises:

a differential unit that generates a differential signal that represents a difference between a gradation voltage and an output voltage;

a first transistor that receives the differential signal at a gate thereof, and sends out an output current from a drain thereof; and a second transistor that receives the differential signal at a gate thereof, and sends out a mirror current that is a copy of the output current sent from the first transistor to one common wiring line connected to an amplifier circuit group having the second transistor, out of the first to k-th common wiring lines, wherein the failure determination circuit comprises:

a multiplexer that selects one of the first to k-th common wiring lines and connects the selected common wiring line to an output node;

a variable resistance that is connected to the output node and that generates an output current detection signal at the output node upon receiving a combined current of the mirror currents sent from second transistors of respective amplifier circuits via the selected common wiring line, the multiplexer, and the output node; and a comparator that determines whether a short-circuit failure or a current leak failure is occurring or has occurred in the first to n-th source lines or not by comparing a level of the output current detection signal with a prescribed threshold value.

* * * * *